United States Patent
Suzuki

(10) Patent No.: US 9,836,261 B2
(45) Date of Patent: Dec. 5, 2017

(54) PRINT CONTROL DEVICE STORING ATTRIBUTE AND HISTORY INFORMATION WITH DIFFERENT FREQUENCIES, AND COMPUTER READABLE MEDIUM THEREOF

(71) Applicant: FUJI XEROX CO., LTD., Tokyo (JP)

(72) Inventor: Yuji Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/220,095

(22) Filed: Jul. 26, 2016

(65) Prior Publication Data
US 2017/0277493 A1 Sep. 28, 2017

(30) Foreign Application Priority Data
Mar. 24, 2016 (JP) .................... 2016-060357

(51) Int. Cl.
*G06F 3/12* (2006.01)

(52) U.S. Cl.
CPC .......... *G06F 3/1268* (2013.01); *G06F 3/1203* (2013.01); *G06F 3/1293* (2013.01)

(58) Field of Classification Search
None
See application file for complete search history.

(56) References Cited

U.S. PATENT DOCUMENTS 9,146,698 B2 * 9/2015 Fukui ..................... G06F 3/121
2008/0288507 A1 * 11/2008 Nakagawa ........... G06F 3/1222
2013/0135679 A1 5/2013 Shinagawa

FOREIGN PATENT DOCUMENTS

JP H05-345449 A 12/1993

OTHER PUBLICATIONS

August 24, 2017 Extended European Search Report issued in European Patent Application No. 16182210.1.

* cited by examiner

Primary Examiner — Thomas D Lee
(74) Attorney, Agent, or Firm — Oliff PLC

(57) ABSTRACT

A print control device includes a management unit that receives a print instruction and manages the print instruction, a generation unit that generates print data of an intermediate format based on the received print instruction, a conversion unit that converts the print data of the intermediate format generated by the generation unit to image data for drawing, a print controller that controls a printing device based on the image data converted by the conversion unit and a storage unit that respectively stores attribute information indicating an attribute of the print instruction stored by the management unit and history information indicating a processing state of the print instruction stored by the generation unit and the conversion unit in a nonvolatile memory after execution of a given process.

13 Claims, 7 Drawing Sheets

FIG. 6

TIMING INSTANCE THAT JOB INFORMATION AND LOG INFORMATION ARE STORED (SYNCHRONIZED OR SAVED)

| STORAGE TIMING / STORING INFORMATION | JOB ADDITION | JOB DELETION | UPDATE OF PRINT SETTING CONTENT | UPDATE OF JOB INFORMATION (NAME OR THE LIKE) | GENERATION OF INTERMEDIATE DATA | DELETION OF GENERATED INTERMEDIATE DATA | GENERATION OF LAST DATA | DELETION OF GENERATED LAST DATA | COMPLETION OF PRINT PROCESS |
|---|---|---|---|---|---|---|---|---|---|
| JOB INFORMATION (JOB MANAGEMENT UNIT 41) | ○ | ○ | ○ | ○ | | | | ○ | ○ |
| JOB CONTROL INFORMATION (JOB CONTROLLER 51) | | | | | ○ | ○ | ○ | ○ | ○ |
| JOB CONTROL INFORMATION (JOB CONTROLLER 61) | | | | | | | ○ | ○ | ○ |
| DATA MANAGEMENT INFORMATION (SPOOL MANAGEMENT UNIT 52) | | | | | ○ | ○ | ○ | ○ | ○ |
| DATA MANAGEMENT INFORMATION (SPOOL MANAGEMENT UNIT 62) | | | | | | | ○ | ○ | ○ |

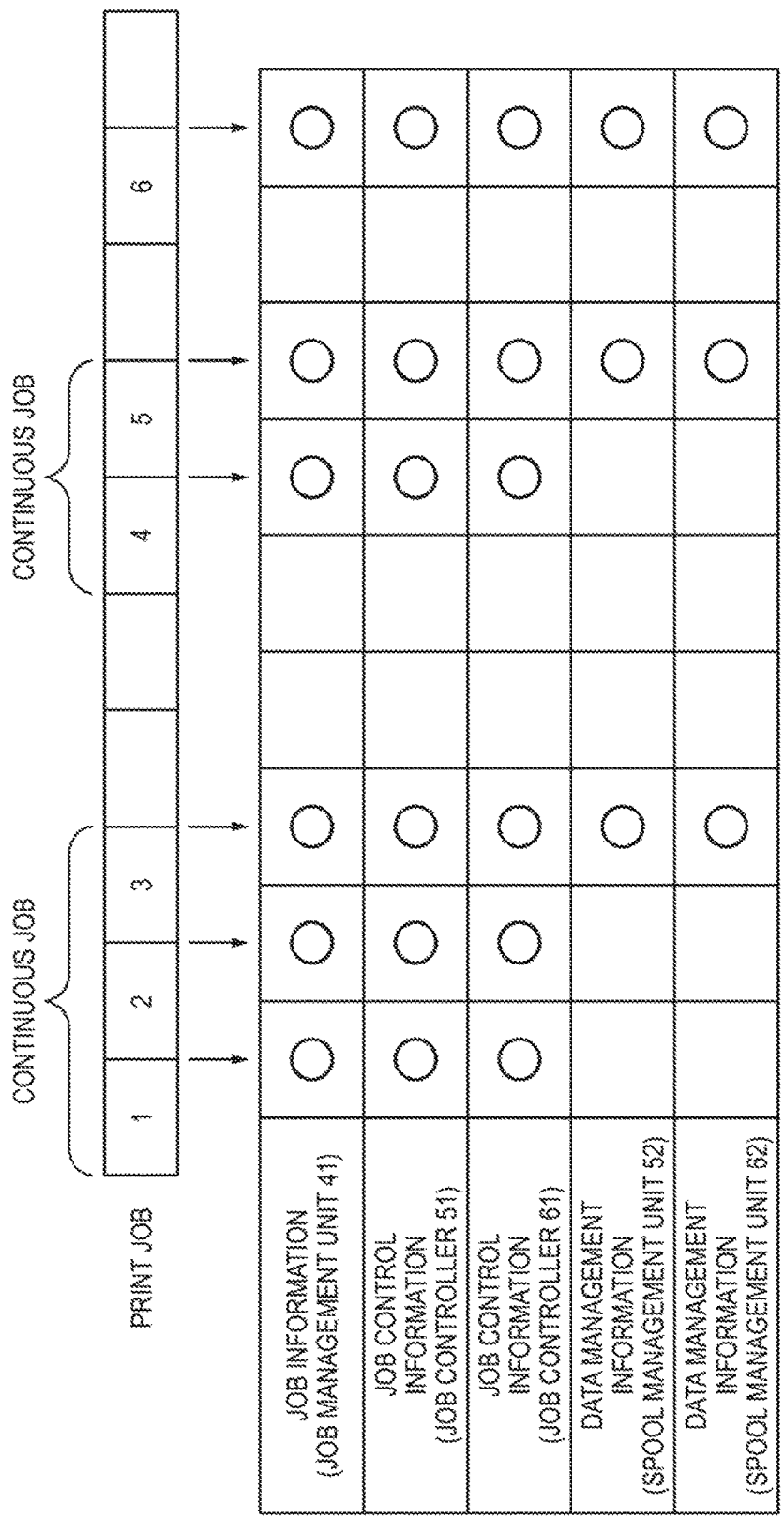

PRINT CONTROL DEVICE STORING ATTRIBUTE AND HISTORY INFORMATION WITH DIFFERENT FREQUENCIES, AND COMPUTER READABLE MEDIUM THEREOF

CROSS-REFERENCE TO RELATED APPLICATIONS

This application is based on and claims priority under 35 USC 119 from Japanese Patent Application No. 2016-060357 filed Mar. 24, 2016.

BACKGROUND

1. Technical Field

The present invention relates to a print control device, a print control method and a computer readable medium.

SUMMARY

A print control device includes a management unit that receives a print instruction and manages the print instruction, a generation unit that generates print data of an intermediate format based on the received print instruction, a conversion unit that converts the print data of the intermediate format generated by the generation unit to image data for drawing, a print controller that controls a printing device based on the image data converted by the conversion unit and a storage unit that respectively stores attribute information indicating an attribute of the print instruction stored by the management unit and history information indicating a processing state of the print instruction stored by the generation unit and the conversion unit in a nonvolatile memory after execution of a given process.

BRIEF DESCRIPTION OF DRAWINGS

Exemplary embodiments of the present invention will be described in detail based on the following figures, wherein:

FIG. 6 is a diagram illustrating a timing instance that job information and log information is stored (synchronized and saved); and FIG. 7 is a diagram illustrating an instance of a process of storing (synchronizing and saving) job information and log information when a print job is continuously executed.

DETAILED DESCRIPTION

Hereinafter, an exemplary embodiment of the present invention will be described in detail with reference to the drawings.

Figure 1:
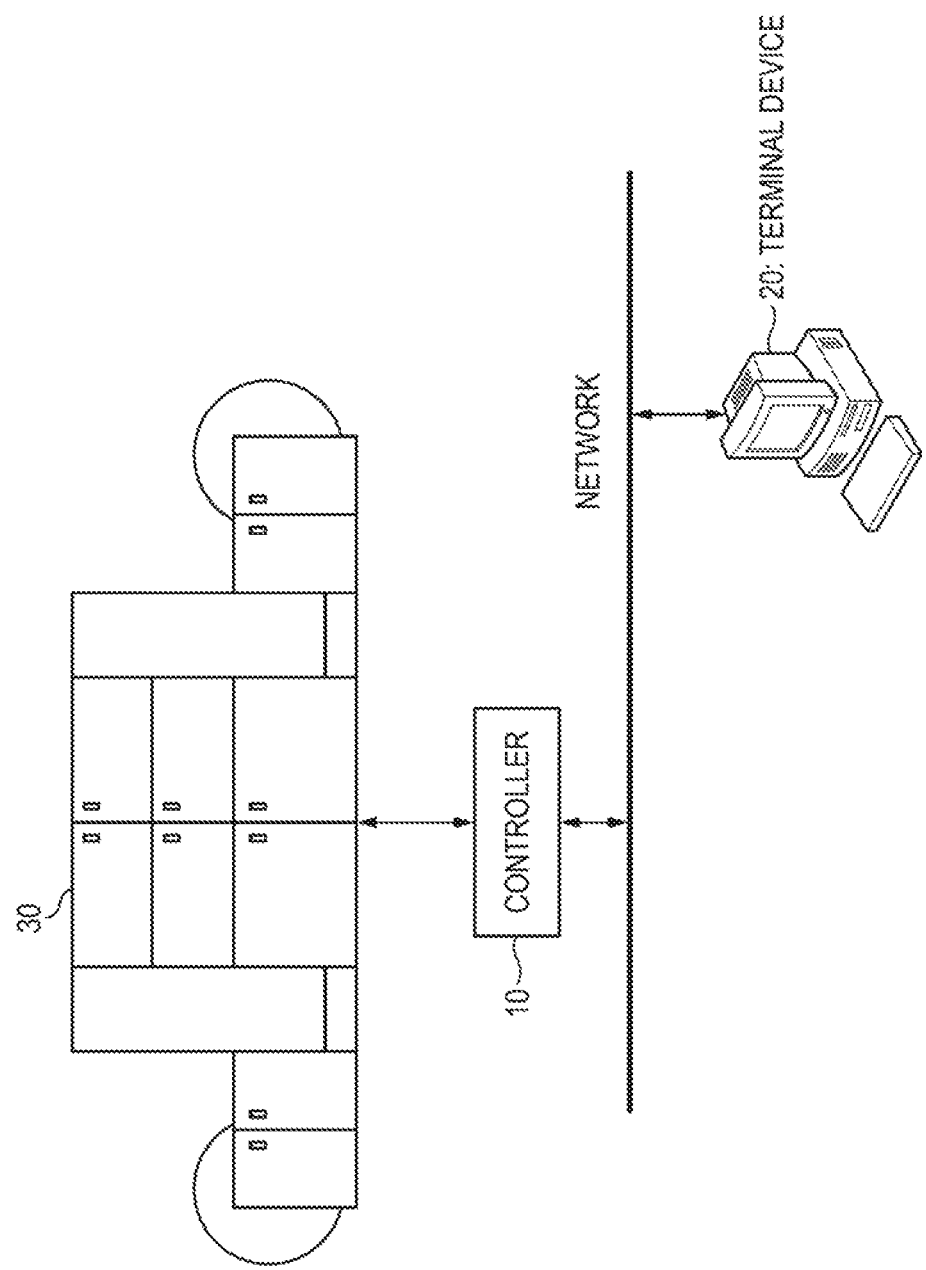
FIG. 1 is a diagram illustrating a system configuration of a printing system according to an exemplary embodiment of the present invention.

FIG. 1 is a diagram illustrating an instance of a configuration of a printing system according to an exemplary embodiment of the present invention. As illustrated in FIG. 1, this printing system includes a printing device 30 that performs printing on a continuous sheet, a controller (print control device) 10, and a terminal device 20.

The terminal device 20 generates a print instruction such as a print job and transmits the print instruction to the controller 10 via a network. The controller 10 functions as a print control device that controls a print operation of the printing device 30 according to the print instruction transmitted from the terminal device 20. The printing device 30 outputs an image corresponding to the print instruction on a continuous sheet based on the control of the controller 10.

Figure 2:
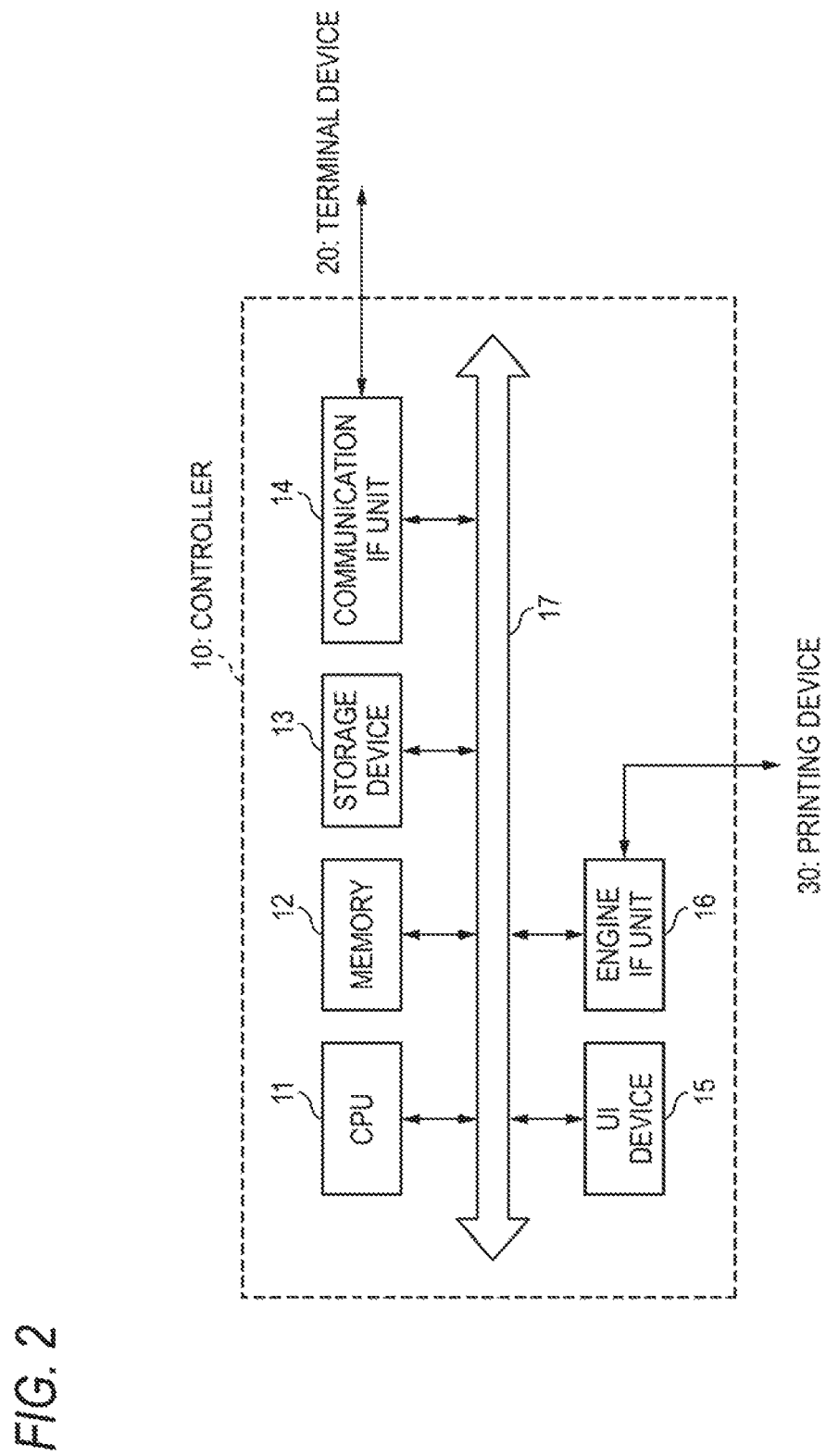
FIG. 2 is a block diagram illustrating a hardware configuration of a controller 10 according to the exemplary embodiment of the present invention.

Next, a hardware configuration of the controller 10 of the printing system according to the present exemplary embodiment will be described with reference to FIG. 2. As illustrated in FIG. 2, the controller 10 of the present exemplary embodiment includes a CPU 11, a memory 12, a storage device 13 such as a hard disk drive (HDD), a communication interface (IF) unit 14 that transmits and receives data to and from the terminal device 20 via a network, a user interface (UI) device 15 configured with a touch panel or a liquid crystal display, and an engine IF unit 16 that transmits and receives data to and from the printing device 30. These components are interconnected through a control bus 17.

The CPU 11 executes a predetermined process based on a print control program stored in the memory 12 or the storage device 13 and controls the operation of the controller 10. In the present exemplary embodiment, a description has been made that the CPU 11 reads and executes the control program stored in the memory 12 or the storage device 13, but it is possible to provide the program to the CPU 11 by being stored in a portable storage medium such as CD-ROM.

Figure 3:
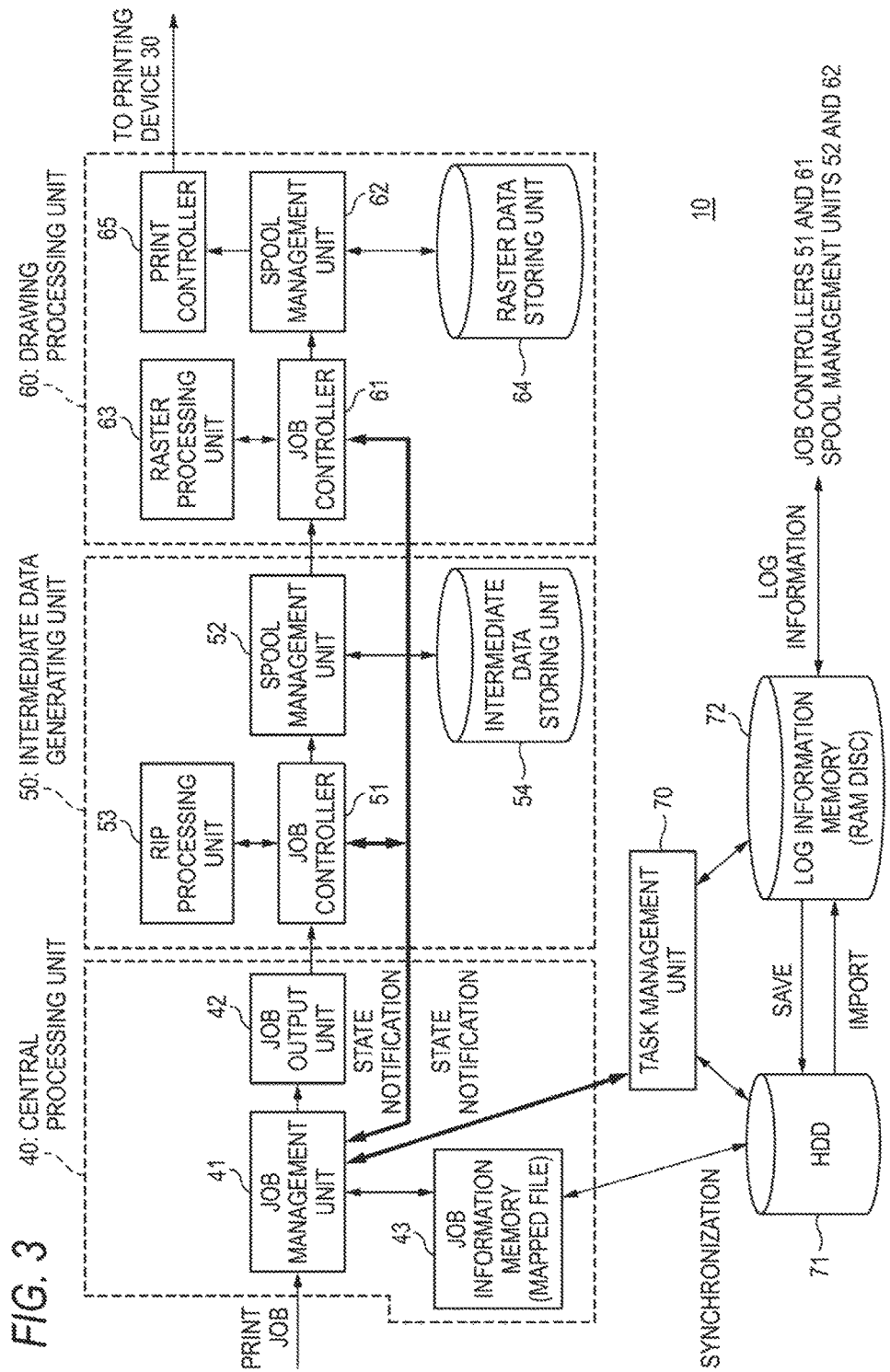
FIG. 3 is a block diagram illustrating a functional configuration of the controller 10 according to the exemplary embodiment of the present invention.

FIG. 3 is a block diagram illustrating a functional configuration of the controller 10 which is realized by the execution of the control program.

As illustrated in FIG. 3, the controller 10 of the present exemplary embodiment includes a central processing unit 40, an intermediate data generating unit 50, a drawing processing unit 60, a task management unit 70, an HDD 71 which is a nonvolatile memory, and a log information memory 72 such as a RAM disc.

Moreover, the central processing unit 40 includes a job management unit 41, a job output unit 42, and a job information memory 43.

Moreover, the intermediate data generating unit 50 includes a job controller 51, a spool management unit 52, a raster image processing (RIP) processing unit 53, and an intermediate data storing unit 54.

Moreover, the drawing processing unit 60 includes a job controller 61, a spool management unit 62, a raster processing unit 63, a raster data storing unit 64, and a print controller 65.

The task management unit 70 performs overall internal management of the system such as the activation and shutdown process of the entire system, control such as activation and shutdown of internal modules associated with this process, state management of the entire system, priority setting of respective modules, management of CPU cores, and adjustment during collection of log information.

At the time of the activation of the system, internal necessary modules are activated by the task management unit 70, and a series of functions of the printer controller including a print process are realized by cooperation of the activated modules.

For instance, a print job (print instruction) described in a page description language, transmitted from the terminal device 20 via a network is first registered in the job management unit 41 of the central processing unit 40. The job management unit 41 is a management unit that receives and manages the transmitted print job. The job management unit 41 manages the state of the registered print job and executes or removes the registered print job based on an instruction front a user interface (UI) or the like. Moreover, the job management unit 41 receives a notification of an execution state of the print job from the job controller 51 of the intermediate data generating unit 50 and the job controller 61 of the drawing processing unit 60 to update the execution state of the print job.

The job management unit 41 stores job information (attribute information) indicating the attribute of a print job, such as a job ID (identifier) of the print job, a file name, and various items of setting information such as the number of pages in the job information memory 43.

The job information memory 43 stores the job information in a file format called a mapped file (memory-mapped file). This mapped file is a storage method of mapping and storing file data directly onto a continuous area of a virtual storage space. According to this method, the job information stored in the HDD 71 in a file format is used as a resource and the information having the same content as the job information stored in the HDD 71 is stored in the job information memory 43.

However, when the job management unit 41 updates the job information in the job information memory 43, the job information in the HDD 71 has a different content from the job information in the job information memory 43 unless predetermined processing is performed.

Thus, the job management unit 41 executes a synchronization process for making the job information in the HDD 71 identical to the job information in the job information memory 43. When this synchronization process is executed, the job information in the HDD 71 has the same content as the job information in the job information memory 43.

The job output unit 42 transmits the print job to the intermediate data generating unit 50 in respective pages based on the control of the job management unit 41.

Here, the intermediate data generating unit 50 generates intermediate data (print data of an intermediate format) based on the print job received by the central processing unit 40. Moreover, the drawing processing unit 60 converts the intermediate data generated by the intermediate data generating unit 50 to raster data (image data of a raster format). The print controller 65 controls the printing device 30 based on the image data converted by the drawing processing unit 60.

The image data of the raster format is an instance of image data for drawing and image data of another format may be used as the image data for drawing.

The intermediate data generating unit 50 transmits the print job transmitted in respective pages from the central processing unit 40 to the RIP processing unit 53 so that the print job is subjected to a RIP process to thereby generate intermediate data (print data of an intermediate format).

The spool management unit 52 stores the intermediate data generated by the RIP processing unit 53 in the intermediate data storing unit 54 as spool data and manages the intermediate data.

When the intermediate data is transmitted from the intermediate data generating unit 50 to the drawing processing unit 60, the job controller 61 of the drawing processing unit 60 executes a raster process on the transmitted intermediate data with the aid of the raster processing unit 63 to convert the intermediate data to image data of a raster format.

The spool management unit 62 of the drawing processing unit 60 stores the image data of the raster format converted by the raster processing unit 63 in the raster data storing unit 64 as spool data and manages the image data.

Upon receiving an instruction to execute a print process from the job management unit 41, the drawing processing unit 60 allows the print controller 65 to transmit the image data of the raster format to the printing device 30 in respective pages so that a print process is executed based on the image data.

In FIG. 3, although the print controller 65 is provided in the drawing processing unit 60, the print controller 65 may be configured to be independent from the drawing processing unit 60.

Here, the job controller 51 notifies the job management unit 41 of a state whether a RIP process is being executed by the intermediate data generating unit 50. Moreover, the job controller 61 notifies the job management unit 41 of a state whether a raster process is being executed by the drawing processing unit 60.

The job management unit 41 sends the state notification received from the job controllers 51 and 61 to the task management unit 70 so that the task management unit 70 can understand the state of the entire system. Specifically, based on the state notification from the job management unit 41, the task management unit 70 can understand whether the RIP process is being executed by the RIP processing unit 53 of the intermediate data generating unit 50 and whether the raster process is being executed by the raster processing unit 63 of the drawing processing unit 60.

Moreover, the log information memory 72 stores log information (history information) indicating the print stop state of a print job when various processes are executed by the job controllers 51 and 61 and the spool management units 52 and 62.

Here, the log information memory 72 is configured as a so-called RAM disc that realizes the same storage device as a disk drive such as a HDD using a volatile memory. The details of the log information will be described below.

Figure 4:
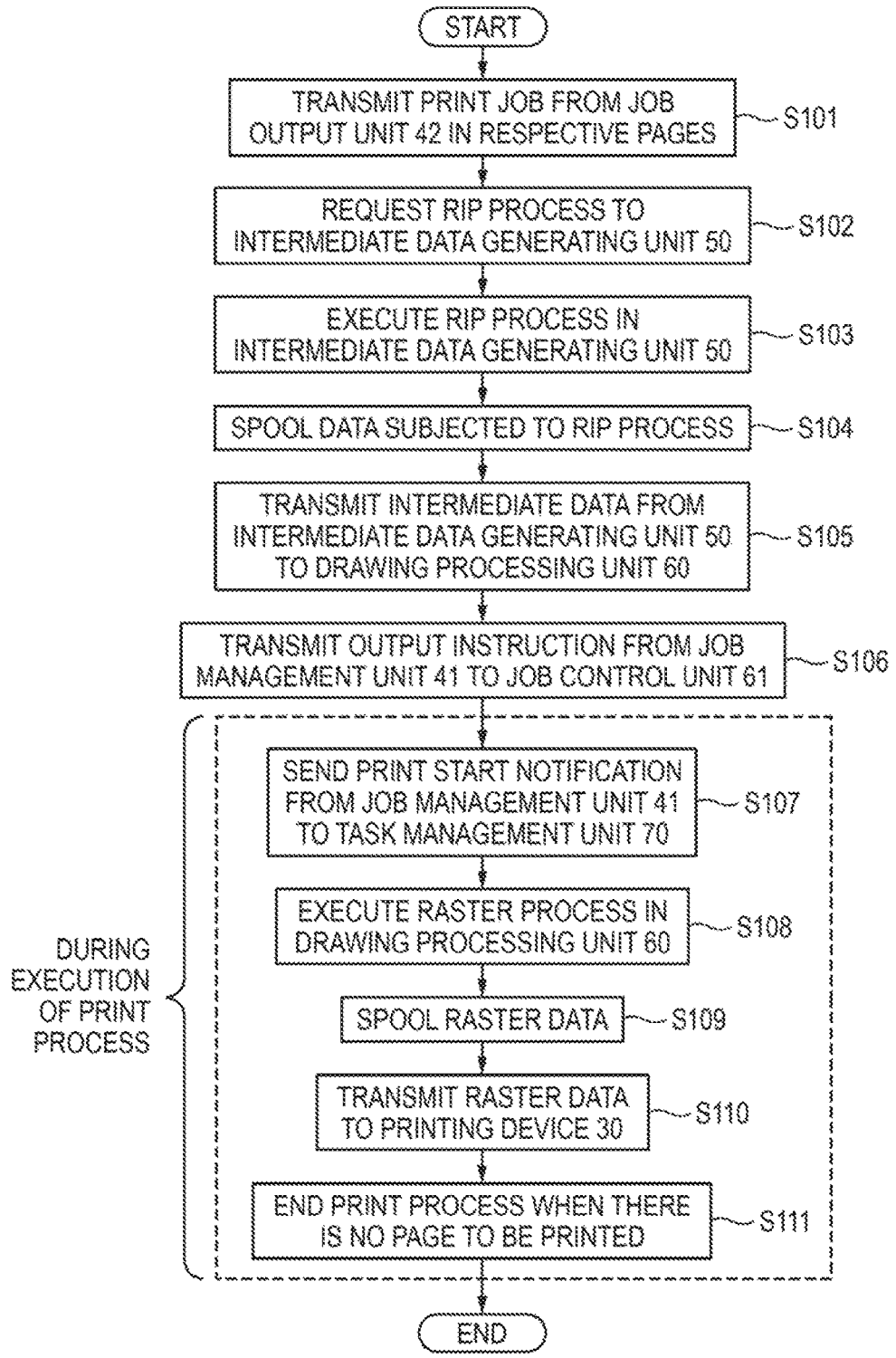
FIG. 4 is a flowchart illustrating an operation of the controller 10 according to the exemplary embodiment of the present invention.

Next, the operation of the controller 10 of the present exemplary embodiment will be described with reference to the flowchart of FIG. 4.

When the job output unit 42 of the central processing unit 40 transmits a print job to the intermediate data generating unit 50 in respective pages (step S101) and the job management unit 41 issues an instruction to execute a RIP process to the job controller 51 (step S102), the RIP processing unit 53 in the intermediate data generating unit 50 executes a RIP process to generate intermediate data (step S103).

The generated intermediate data is stored in the intermediate data storing unit 54 as spool data, and the spool management unit 52 manages the stored intermediate data (step S104).

When the intermediate data is transmitted from the intermediate data generating unit 50 to the drawing processing unit 60 (step S105) and an output instruction is transmitted from the job management unit 41 to the job controller 61 (step S106), the job controller 61 notifies the job management unit 41 of the start of a print process and the job management unit 41 notifies the task management unit 70 of the start of printing (step S107).

In the drawing processing unit 60, the raster processing unit 63 executes a raster process on the intermediate data (step S108) and the raster data is stored in the raster data storing unit 64 and is managed by the spool management unit 62 (step S109).

The print controller 65 transmits the spooled raster data to the printing device 30 and executes a print process (step S110).

The print controller 65 executes the print process until there is no raster data of a page to be printed and ends the print process when there is no page data to be printed (step S111). The job controller 61 notifies the job management unit 41 of the end of the print process and the job management unit 41 notifies the task management unit 70 of the end of the print process.

A period until the job management unit 41 notifies the task management unit 70 of the end of the print process after the job management unit 41 notifies the task management unit 70 of the start of printing is a period in which it is determined that the task management unit 70 is under execution of the print process.

[Outline of Data Storage Process]

In the controller 10 of the present exemplary embodiment, in order to realize high-speed processing, job information indicating the attribute of a print job and log information necessary for the control of the intermediate data generating unit 50 and the drawing processing unit 60 are stored in the job information memory 43 and the log information memory 72 and are used.

However, when the job information memory 43 and the log information memory 72 are configured with volatile memories and power is interrupted, the contents stored therein may be deleted.

Thus, even when the system is reactivated after it is shut down, in order to restore to the original state before the shutdown, the job management unit 41 and the task management unit 70 execute a process of storing these items of information in the HDD 71 which is a nonvolatile memory before the shutdown.

Specifically, in the controller 10 of the present exemplary embodiment, when the system is shut down, the job management unit 41 performs a synchronization process of synchronizing the job information stored in the job information memory 43 with the job information stored in the HDD 71. Moreover, the task management unit 70 performs a process of saving the log information stored in the log information memory 72 in the HDD 71.

However, in order to restore to the original state even when an unexpected power interruption occurs as well as a power interruption based on a normal operation, the job management unit 41 and the task management unit 70 execute synchronization of the job information in the job information memory 43 and saving of the log information in the log information memory 72 in cases other than the normal power interruption.

The job information synchronization process and the log information saving process will be collectively referred to as a data storage process. Hereinafter, this data storage process will be described.

First, a list of items of information stored (synchronized and saved) in the HDD 71 will be described with reference to FIG. 5.

Figure 5:
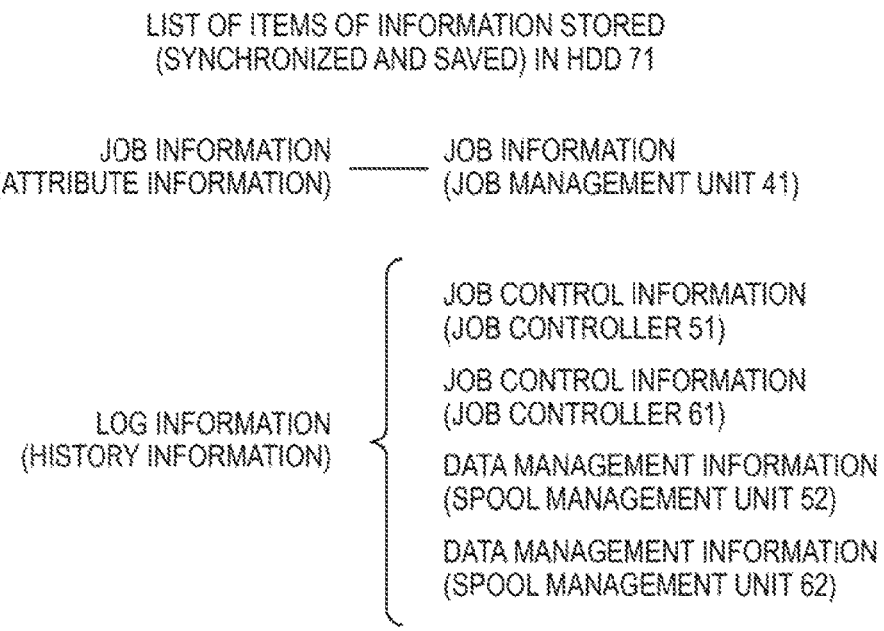
FIG. 5 is a diagram illustrating a list of items of information stored (synchronized and saved) in a HDD 71.

As can be understood from FIG. 5, when a data storage process is executed, the job management unit 41 stores the job information stored in the job information memory 43 in the HDD 71 and the task management unit 70 stores the log information (history information) used in the intermediate data generating unit 50 and the drawing processing unit 60 in the HDD 71.

Here, the log information includes job control information which is used in the job controller 51 of the intermediate data generating unit 50 mid indicates the processing state of a print job being processed, job control information which is used in the job controller 61 of the drawing processing unit 60 and indicates the processing state of a print job being processed, data management information for managing the intermediate data stored in the intermediate data storing unit 54 of the spool management unit 52, and data management information for managing the raster data stored in the raster data storing unit 64 of the spool management unit 62.

Specifically, the job control information is information indicating the processing state of a print job being processed such as information indicating to which page processing has been executed. Moreover, the data management information is information indicating a storage location or the like in which the intermediate data storing unit 54 and the raster data storing unit 64 store the intermediate data and the raster data.

[Details of Data Storage Process]

Here, the job management unit 41 and the task management unit 70 of the present exemplary embodiment store the job information stored in the job information memory 43 and the log information stored by the job controller 51 of the intermediate data generating unit 50 and the job controller 61 of the drawing processing unit 60 in the HDD 71 after respectively executing given processing on them.

Specifically, the job management unit 41 and the task management unit 70 store the job information, the job control information, and the data management information in the HDD 71 after respectively executing the given processing on them at the timing illustrated in FIG. 6.

For example, the job management unit 41 stores the job information, which has been stored in the job information memory 43, in the HDD 71, when the print job is received to the job management unit 41 (job addition), the print job received to the job management unit 41 is deleted (job deletion), print setting contents are updated, or, for example, an attribute of the print job such as a name is updated.

In addition, the job management unit 41 and the task management unit 70 stores the job information, which has been stored in the job information memory 43, and the log information (job control information or data management information), which is stored by the job controller 51 of the intermediate generating unit 50 and the spool management unit 52, in the HDD 71 when intermediate data is generated by the RIP processing unit 53 of the intermediate data generating unit 50 or when the generated intermediate data is deleted.

The job management unit 41 and the task management unit 70 stores the job information, which has been stored in the job information memory 43, the log information (job control information or data management information), which is stored by the job controller 51 of the intermediate generating unit 50 and the spool management unit 52, and the log information, which has been stored by the job controller 61 and the spool management unit 62 of the drawing processing unit 60, in the HDD 71 when raster data is converted by the raster processing unit 63 of the drawing processing unit 60, the converted raster data is deleted, or the print process is completed based the print job.

In a timing instance of a data storage illustrated in FIG. 6, after the print process is completed, the job management unit 70 stores all types of log information including data management information in the HDD 71.

However, even when the print process is completed based on the print job as illustrated in FIG. 7, the job management unit 70 stores the job control information (job controller 51, job controller 61) of the log information in the HDD 71 and may not store the data management information (spool management unit 52, spool management unit 62) of the log information in the HDD 71 in the case of continuously executing the print process based another print job.

For instance, referring to FIG. 7, since print jobs 1, 2, and 3 are a continuous job that is continuously executed, it can be seen that, after the print process of the print jobs 1 and 2 is completed, job information (job management unit 41) and job control information (job controller 51 or 61) are only stored, and data management information (spool management unit 52 or 62) is not stored.

Then, a can be seen that, after the print process of the print job 3 is completed, data management information (spool management unit 52 or 62) as well as job information (job management unit 41) and job control information (job controller 51 or 61) is stored because the next print job is not continuously executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising:
    at least one processor that performs the functions of:
    a job management unit that receives a print instruction and manages the print instruction;
    a first volatile memory that stores attribute information indicating an attribute of the print instruction;
    an intermediate data generation unit that generates print data of an intermediate format based on the received print instruction;
    a drawing processing unit that converts the print data of the intermediate format to image data for drawing;
    a print controller that controls a printing device based on the image data;
    a second volatile memory that stores history information indicating a processing state of the print instruction in the intermediate data generation unit and the drawing processing unit; and
    a nonvolatile memory that stores the attribute information stored in the first volatile memory after execution of a first given process with a first frequency and stores the history information stored in the second volatile memory after execution of a second given process with a second frequency, the first frequency being different from the second frequency.

2. The print control device according to claim 1, wherein the nonvolatile memory stores the attribute information stored in the first volatile memory in a case where:
    the print instruction is received; or
    the received print instruction is deleted; and
    the nonvolatile memory stores the attribute information stored in the first volatile memory and the history information stored in the second volatile memory in a case where:
    the print data of the intermediate format is generated; or
    the print data of the intermediate format is deleted.

3. The print control device according to claim 2, wherein the history information includes first control information indicating a processing state of a print instruction being processed by the intermediate data generation unit, second control information indicating a processing state of a print instruction being processed by the drawing processing unit, first management information for managing the generated print data of the intermediate format, and second management information for managing the converted image data for drawing.

4. The print control device according to claim 3, wherein even when the print process based on the print instruction is completed, the nonvolatile memory stores the first and second control information of the history information and does not store the first and second management information in a case where a print process based on another print instruction is continuously executed.

5. The print control device according to claim 1, wherein the nonvolatile memory stores the attribute information stored in the first volatile memory in a case where:
    the print instruction is received; or
    the received print instruction is deleted, and
    the nonvolatile memory stores the attribute information stored in the first volatile memory and the history information stored in the second volatile memory in a case where the print data of the intermediate format is converted to the image data for drawing or the image data for drawing is deleted.

6. The print control device according to claim 5, wherein the history information includes first control information indicating a processing state of a print instruction being processed by the intermediate data generation unit, second control information indicating a processing state of a print instruction being processed by the drawing processing unit, first management information for managing the generated print data of the intermediate format, and second management information for managing the converted image data for drawing.

7. The print control device according to claim 6, wherein even when the print process based on the print instruction is completed, the nonvolatile memory stores the first and second control information of the history information and does not store the first and second management information in a case where a print process based on another print instruction is continuously executed.

8. The print control device according to claim 1, wherein the nonvolatile memory stores the attribute information stored in the first volatile memory in a case where:
    the print instruction is received; or
    the received print instruction is deleted, and
    the nonvolatile memory stores the attribute information stored in the first volatile memory and the history information stored in the second volatile memory in a case where a print process is completed based on the print instruction.

9. The print control device according to claim 8, wherein the history information includes first control information indicating a processing state of a print instruction being processed by the intermediate data generation unit, second control information indicating a processing state of a print instruction being processed by the drawing processing unit, first management information for managing the generated print data of the intermediate format, and second management information for managing the converted image data for drawing.

10. The print control device according to claim 9, wherein even when the print process based on the print instruction is completed, the nonvolatile memory stores the first and second control information of the history information and does not store the first and second management information in a case where a print process based on another print instruction is continuously executed.

11. A print control device comprising:
at least one processor that performs the functions of:
a job management unit that receives a print instruction and manages the print instruction;
a first volatile memory that stores attribute information indicating an attribute of the print instruction;
an intermediate data generation unit that generates print data of an intermediate format based on the received print instruction;
a drawing processing unit that converts the print data of the intermediate format to image data for drawing;
a print controller that controls a printing device based on the image data for drawing;
a second volatile memory that stores history information indicating a processing state of the print instruction in the intermediate data generation unit and the drawing processing unit; and
a nonvolatile memory that stores the attribute information stored in the first volatile memory and the history information stored in the second volatile memory after execution of a given process, wherein the history information includes first control information indicating a processing state of a print instruction being processed by the intermediate data generation unit, second control information indicating a processing state of a print instruction being processed by the drawing processing unit, first management information for managing the generated print data of the intermediate format, and second management information for managing the converted image data for drawing.

12. The print control device according to claim 11, wherein even when the print process based on the print instruction is completed, the nonvolatile memory stores the first and second control information of the history information and does not store the first and second management information in a case where a print process based on another print instruction is continuously executed.

13. A non-transitory computer readable storage medium storing a program causing a computer to execute a process for print control, the process comprising:
receiving and managing a print instruction;
storing attribute information indicating an attribute of the print instruction generated when managing the print instruction in a first volatile memory;
generating print data of an intermediate format based on the received print instruction;
converting the print data of the intermediate format to image data for drawing;
storing history information indicating a processing state of the print instruction in generating and converting the print data of the intermediate format in a second volatile memory;
controlling a printing device based on the image data converted in the conversion; and
storing the attribute information in a nonvolatile memory after execution of a first given process with a first frequency and storing the history information in the nonvolatile memory after execution of a second given process with a second frequency, the first frequency being different from the second frequency.

* * * * *